US010230321B1

United States Patent
Papini et al.

(10) Patent No.: US 10,230,321 B1
(45) Date of Patent: Mar. 12, 2019

(54) SYSTEM AND METHOD FOR PREVENTING PERMANENT MAGNET DEMAGNETIZATION IN ELECTRICAL MACHINES

(71) Applicant: General Electric Company, Schenectady, NY (US)

(72) Inventors: Francesco Papini, Munich (DE); Tiziana Bertoncelli, Garching b. Munchen (DE); Mohamed Osama, Garching (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/790,251

(22) Filed: Oct. 23, 2017

(51) Int. Cl.
*H02H 7/08* (2006.01)
*H02P 29/028* (2016.01)
*H02P 9/00* (2006.01)
*H02P 6/12* (2006.01)

(52) U.S. Cl.
CPC ............. *H02P 29/028* (2013.01); *H02P 6/12* (2013.01); *H02P 9/006* (2013.01); *H02P 2207/05* (2013.01)

(58) Field of Classification Search
CPC .... H02P 27/06; H02P 29/0241; H02P 29/024; H02P 29/027
See application file for complete search history.

(56) References Cited

U.S. PATENT DOCUMENTS

| 4,651,066 A | 3/1987 | Gritter et al. |
| 4,710,667 A | 12/1987 | Whiteley |
| 6,043,632 A | 3/2000 | Maehara et al. |
| 6,359,359 B1 | 3/2002 | Miura et al. |

(Continued)

FOREIGN PATENT DOCUMENTS

| JP | 2005127406 A | 5/2005 |
| WO | 2003016794 A1 | 2/2003 |

OTHER PUBLICATIONS

Richter et al., "The Ferrite Permanent Magnet AC Motor—A Technical and Economical Assessment", IEEE Transactions on Industry Applications, vol. IA-21, No. 4, May/Jun. 1985, pp. 644-650.

(Continued)

*Primary Examiner* — Karen Masih
(74) *Attorney, Agent, or Firm* — Ziolkowski Patent Solutions Group, SC; Jean K. Testa

(57) ABSTRACT

A motor drive for driving a permanent magnet electrical machine includes an inverter having switches that are selectively operated to control current flow and terminal voltages in the electrical machine and a controller operatively connected to the inverter to control switching of the switches to control the current flow and terminal voltages in the electrical machine. The controller receives inputs regarding at least one of currents and voltages provided to the electrical machine on one or more phases, analyzes the voltages and currents to identify a fault in the electrical machine, and controls switching of the plurality of switches in the inverter (Continued)

to modify current flow and terminal voltages in the electrical machine based on the identified fault, with the modified current flow and terminal voltages in the electrical machine preventing demagnetization of the permanent magnets in the electrical machine.

25 Claims, 10 Drawing Sheets

(56) References Cited

U.S. PATENT DOCUMENTS

| | | |
|---|---|---|
| 6,606,019 B1 | 8/2003 | Ohashi |
| 6,741,002 B2 | 5/2004 | Nishiyama et al. |
| 7,258,526 B2 | 8/2007 | Dooley et al. |
| 7,425,786 B2 | 9/2008 | Hino et al. |
| 7,843,100 B2 | 11/2010 | Blissenbach et al. |
| 8,258,658 B2 | 9/2012 | Heitzler et al. |
| 2005/0093393 A1* | 5/2005 | Hirzel ............... H02K 3/12 310/268 |
| 2011/0241467 A1 | 10/2011 | Fujioka et al. |
| 2012/0126731 A1* | 5/2012 | Wyrembra ......... H02K 37/12 318/400.14 |
| 2012/0299409 A1 | 11/2012 | Choi et al. |
| 2013/0119811 A1* | 5/2013 | Kobayashi ........... H02K 1/02 310/156.53 |
| 2016/0109133 A1* | 4/2016 | Edwards .............. F02C 7/228 60/786 |

OTHER PUBLICATIONS

Sanada et al., "Rotor Structure for Reducing Demagnetization of Magnet in a PMASynRM with Ferrite Permanent Magnet and Its Characteristics", IEEE Energy Conversion Congress and Exposition (ECCE), Sep. 17-22, 2011, Phoenix, AZ, pp. 4189-4194.

* cited by examiner

SYSTEM AND METHOD FOR PREVENTING PERMANENT MAGNET DEMAGNETIZATION IN ELECTRICAL MACHINES

BACKGROUND OF THE INVENTION

The invention relates generally to permanent magnet electrical machines and, more particularly, to a system and method for implementing a post-fault protection scheme for preventing demagnetization of permanent magnets in such electrical machines.

The usage of electrical machines in various industries has continued to become more prevalent in numerous industrial, commercial, and transportation industries over time. One such type of electrical machine that is commonly used in such industries is permanent magnet (PM) machines—which are electrical machines with permanent magnets positioned in/on the machine to provide the magnetic field against which the rotor field interacts to produce torque in the electrical machine. In most standard PM machines, i.e., PM synchronous machines, the permanent magnets are positioned on the rotor and are either surface mounted on or embedded inside a lamination stack of the rotor. In stator PM machines, the permanent magnets and windings are located in the stator instead of the conventional rotor permanent magnet topology, with examples of stator PM machines including permanent magnet flux switching machines, flux reversal machines, and doubly-salient permanent magnet machines.

One drawback to PM electrical machines is the prohibitive costs of the materials used to form the permanent magnets, as permanent magnets are often formed at least partially of expensive rare-earth elements, with neodymium magnets being a common example. To reduce costs, ceramic permanent magnets may be employed as an alternative to rare-earth permanent magnets. Ceramic magnets are cheap and can be used to improve the performances of PM synchronous machines or stator PM machines. However, ceramic permanent magnets exhibit little resistance to demagnetization against the high demagnetizing magnetic fields that arise in the event of an internal fault in the motor windings. Once the magnets are demagnetized, both the stator and the rotor of the machine must be scrapped. Moreover, a sudden fault in the motor might also lead to damages to the process the machine is associated with, because of the uncontrolled halt of such process.

Therefore, it would be desirable to provide a system and method for preventing the demagnetization of low cost permanent magnets (e.g., ceramic permanent magnets) after a fault. Prevention of such demagnetization allows for the electrical machine to be protected while the process it is connected to is brought to a halt in a safe and controlled manner, with the damage to the electrical machine thus being limited only to the windings thereof, which can relatively easily be reconstructed.

BRIEF DESCRIPTION OF THE INVENTION

In accordance with one aspect of the invention, a motor drive for driving an electrical machine having one or more permanent magnets therein is provided. The motor drive includes an inverter having a plurality of switches therein that are selectively operated to control current flow and terminal voltages in the electrical machine and a controller operatively connected to the inverter and configured to control switching of the plurality of switches to control the current flow and terminal voltages in the electrical machine. The controller is programmed to analyze at least one of voltages and currents provided to the electrical machine on one or more phases to identify a fault in the electrical machine, and control switching of the plurality of switches in the inverter to modify current flow and terminal voltages in the electrical machine based on the identified fault, wherein the modified current flow and terminal voltages in the electrical machine prevent demagnetization of the one or more permanent magnets in the electrical machine.

In accordance with another aspect of the invention, a method for implementing a post-fault protection technique for preventing demagnetization of permanent magnets in an electrical machine is provided. The method includes monitoring, via a controller, at least one of voltages and currents supplied to the electrical machine, analyzing, via the controller, the at least one of the voltages and currents supplied to the electrical machine to detect a fault condition in the electrical machine, determining, via the controller, a fault type of the detected fault condition based on the analyzed at least one of the voltages and currents, and modifying, via the controller, the voltages and currents supplied to the electrical machine on at least one phase based on the determined fault type, wherein modifying the voltages and currents supplied to the electrical machine on the at least one phase constrains a fault current in the electrical machine, so as to control a negative d-axis magnetic flux in the electrical machine and thereby prevent demagnetization of the permanent magnets.

In accordance with yet another aspect of the invention, a controller configured to control operation of an inverter so as to control currents and voltages output to a permanent magnet electrical machine connected thereto is provided. The controller comprises a processor programmed to receive inputs regarding at least one of currents and voltages provided to the permanent magnet electrical machine on one or more phases, analyze the at least one of the voltages and currents to identify a fault in the permanent magnet electrical machine and, upon identification of a fault, control switching of a plurality of switches in the inverter to modify the currents and voltages provided to the permanent magnet electrical machine based on a type of the identified fault. The modified currents and voltages provided to the permanent magnet electrical machine maintain a d-axis magnetic flux in the permanent magnet electrical machine at a level that prevents demagnetization of one or more permanent magnets therein.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to PM electrical machines, including, but not limited to, low cost permanent magnets (e.g., ceramic permanent magnets), with control schemes for controlling voltages and currents supplied to the PM electrical machine being provided that, upon detection of a fault condition in the motor, avoid demagnetization of the magnets upon an occurrence of such a fault. Such control schemes can be utilized in permanent magnet machines where the permanent magnets are located on the rotor or on the stator, and the magnet configuration can be SPM (Surface Permanent magnet) including Halbach array, IPM (interior permanent magnet), XPM (Inset permanent magnet), spoke PM, or any other configuration. The permanent magnet machines include either ceramic permanent magnets (or other low-cost permanent magnets) that exhibit little resistance to demagnetization against the high demagnetizing magnetic fields that arise in the event of a fault in the machines, or other higher cost permanent magnets that exhibit higher resistance to demagnetization (e.g., rare earth magnets such as neodymium or samarium magnets) they may also be subject to demagnetization in certain applications, such as when used in high-power dense electric machines. For purposes of illustrating how embodiments of the invention may be implemented, the description here below refers mostly to the particular embodiment of a turn-to-turn fault happening in a three-phase, radial-flux rotating machine. However, it is recognized that different types of faults, different types of machines (e.g. linear machines or axial flux machines, three-phase or other multiphase machines, etc.) are considered to be within the scope of the present invention.

Figure 1:
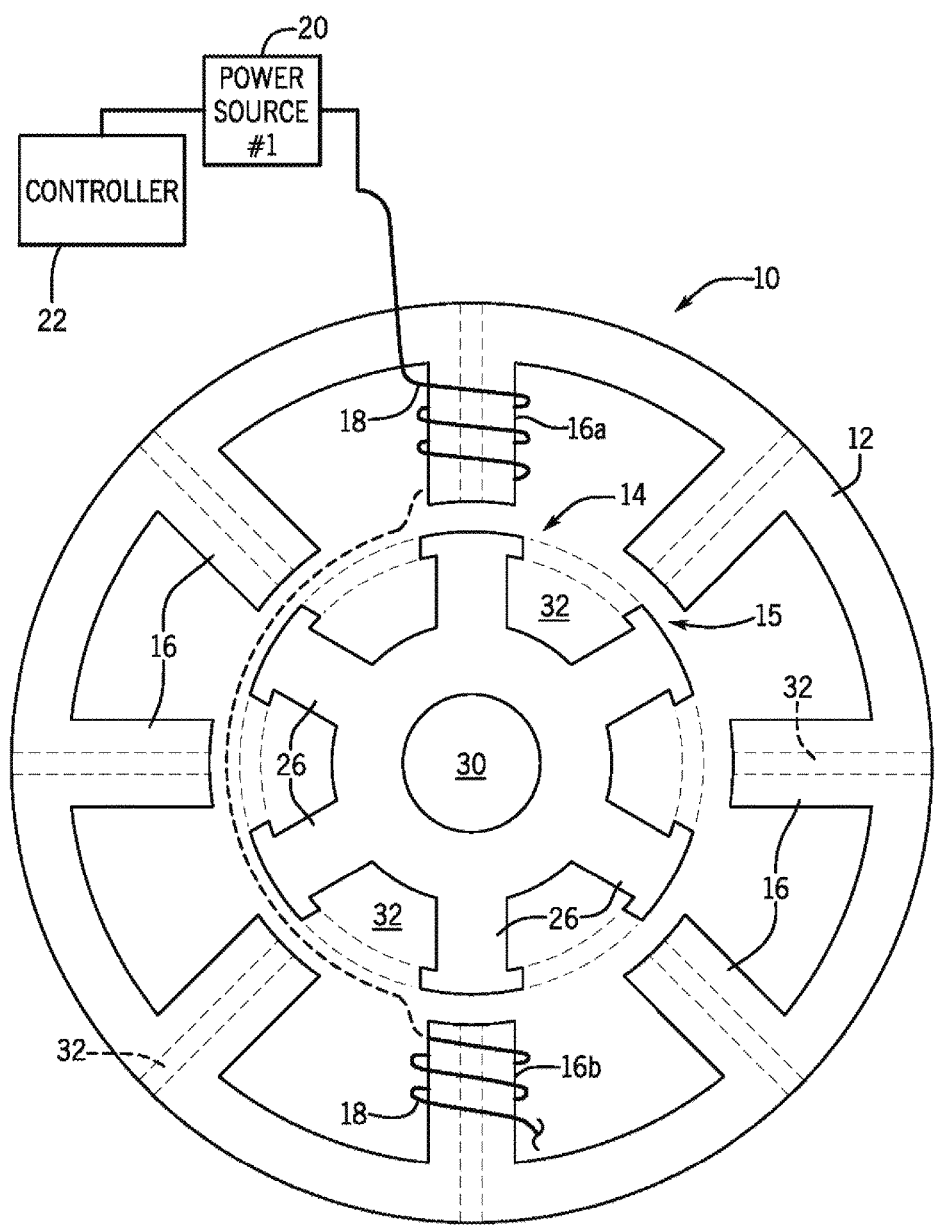
FIGS. 1 and 2 are views of a permanent magnet machine useable with embodiments of the invention.
Figure 2:
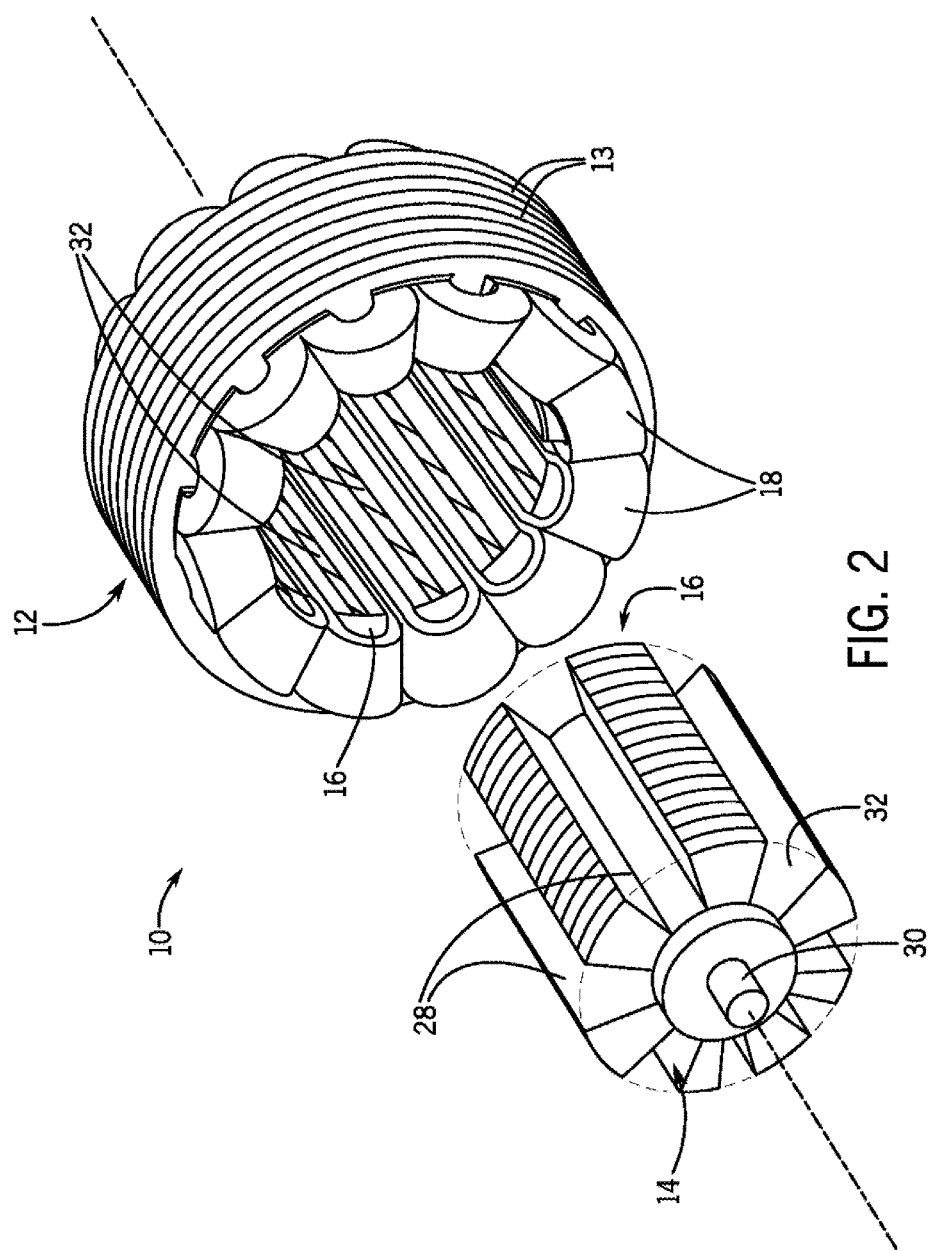

Referring to FIGS. 1 and 2, a typical PM electrical machine 10 that may benefit from embodiments of the present invention is shown. The electrical machine 10 includes a stator 12 (e.g., laminated iron stator formed of laminations 13) that surrounds a rotor 14 in the radial direction and extends axially along rotor 14, with an air-gap 15 being present between the stator 12 and rotor 14. The stator 12 further includes a plurality of stator poles 16, with each stator pole 16 being matched with a radially opposite stator pole to form a stator pole pair. Stator pole pairs 16*a* and 16*b* are wound with a phase winding 18 that may be driven in a conventional manner via a power source 20 (e.g., controlled AC power source) that is controllable by a controller 22. Separate phase windings 18, are also included on the other stator poles 16 in a like manner.

As shown in FIG. 1, the rotor 14 is formed as a salient rotor having a plurality of salient pole pieces 26, although it is recognized that rotor could have an alternate construction (e.g., round rotor). According to one embodiment, the rotor 14 is constructed of a stack of integral laminations 28, as can be seen in the view of the rotor 14 provided in FIG. 2, although it is recognized that the rotor core could also be formed as a single piece—with the core being machined out of steel or formed from sintered magnetic materials, for example. The rotor 14 includes multiple projections/teeth 26 acting as salient magnetic poles. A central portion of the rotor 14 includes a rotor bore through which a drive shaft 30 may be inserted, about which the rotor 14 can rotate.

The exact structure of the electrical machine may take one of numerous forms, according to embodiments of the invention. For example, the electrical machine may be configured as a stator PM machine (e.g., permanent magnet flux switching machine, permanent magnet flux reversal machine, or doubly-salient permanent magnet machine, for example) that includes permanent magnets 32 (shown in phantom) embedded in the stator. In such stator PM machines, electric current in the windings 18, interacts with magnetic fields associated with the magnets 32 to cause rotation of the rotor 14. The electrical machine may be instead be configured as an internal permanent magnet (IPM) machine that includes permanent magnets 32 (shown in phantom) affixed to or embedded in the rotor. In such IPM machines, electric current in the windings 18, interacts with magnetic fields associated with the magnets 32 to cause rotation of the rotor 14.

Figure 3:
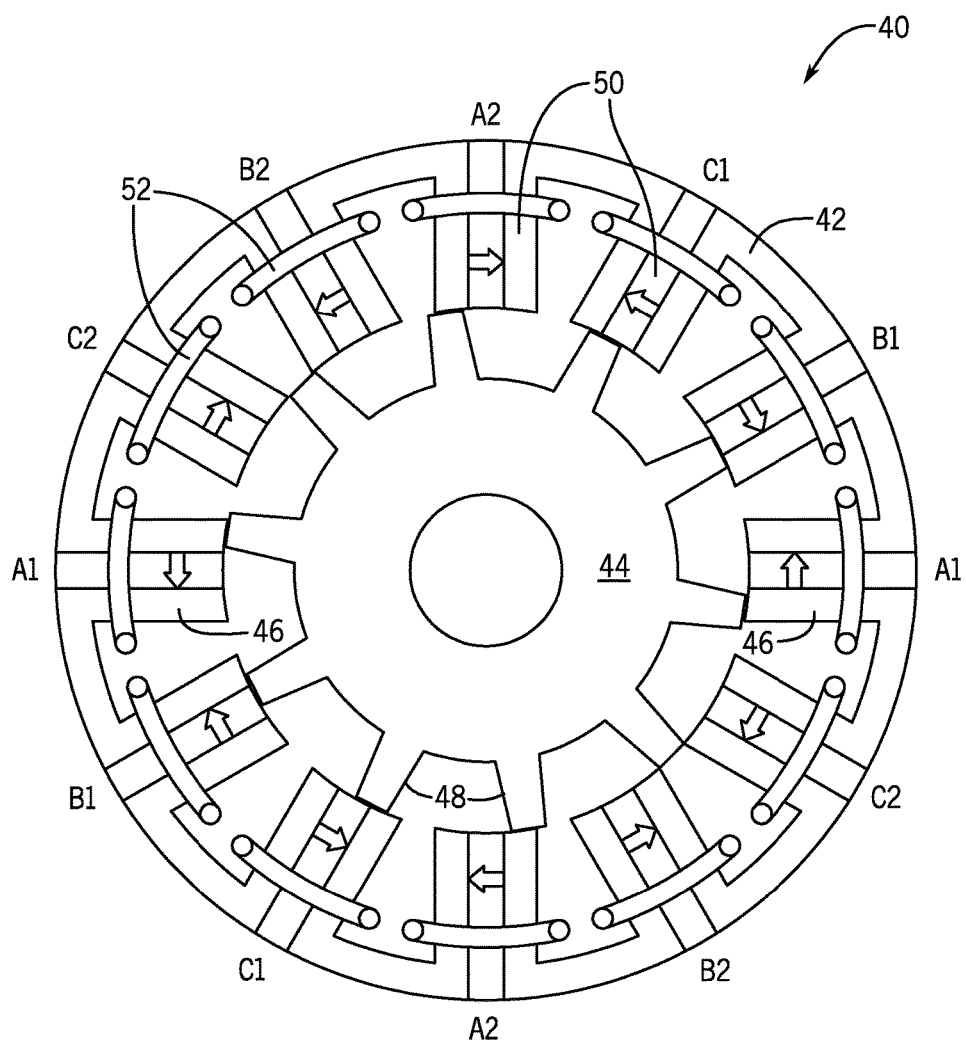
FIG. 3 is a schematic view of a flux-switching permanent magnet machine useable with embodiments of the invention.

More specific examples of various permanent magnet electrical machines are shown in FIGS. 3-8 that may be implemented according to embodiments of the invention. Referring first to FIG. 3, a schematic plan view of a flux-switching permanent magnet machine 40 is shown according to an embodiment of the invention. In the flux-switching permanent magnet machine 40, a stator 42 is shown positioned relative to a rotor 44, with the stator 42 and the rotor 44 each having respective teeth 46, 48. A permanent magnet 50 is embedded on each tooth of the stator lamination 42. The rotor 44 and the stator 42 have different numbers of teeth, and therefore for any orientation of the rotor 44 relative to the stator 42, certain ones of the rotor teeth are offset relative to the closest stator teeth. As alternating current is passed through stator windings 52, a variable magnetic field is generated that is superimposed over the fixed magnetic field resulting from the permanent magnets 50. The resultant combined magnetic field varies with time, causing the rotor 44 to rotate within the stator 42 as it attempts to bring the rotor teeth 48 to a position of minimum reluctance with respect to the stator teeth 46.

Figure 4:
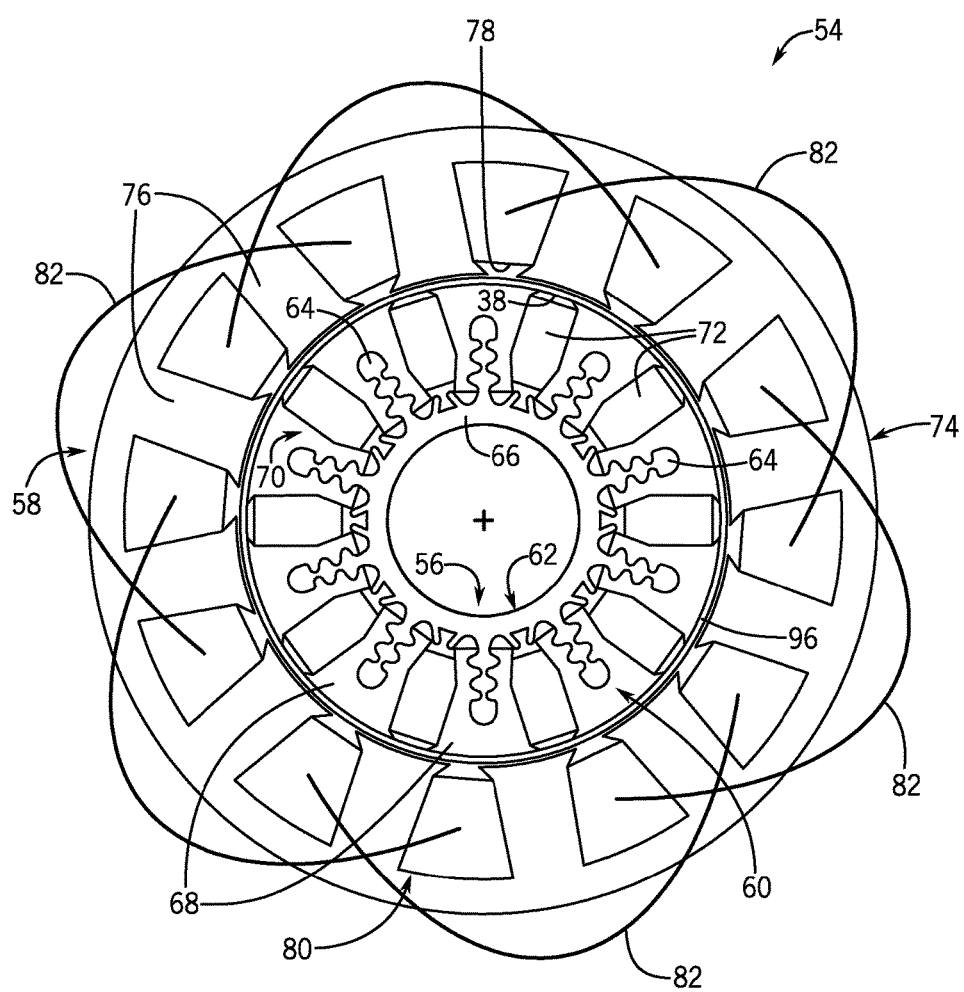
FIG. 4 is a schematic view of a spoke rotor permanent magnet machine useable with embodiments of the invention.

Referring to FIG. 4, an IPM machine 54 including a rotor assembly 56 and a stator assembly 58 is shown that is configured as a segmented spoke rotor permanent magnet machine. The rotor assembly 56 includes a rotor core 60 disposed on a rotor shaft 62, with the rotor core 60 being configured to rotate about a longitudinal axis of the IPM machine 54. The shaft 62 is constructed to have multiple protrusions 64 formed on a main shaft body 66, with the protrusions 64 being formed circumferentially about the main shaft body 66 and along an axial length of the main shaft body 66.

As shown in FIG. 4, the rotor core 60 is constructed as a segmented rotor formed from a plurality of separate salient rotor poles 68. Each of the rotor poles 68 is formed from a stack of laminations (not shown) that is disposed on a respective protrusion 22. The stacks of laminations forming the rotor poles 68 are arranged (i.e., dovetailed) circumferentially around the shaft 62, such that interpolar gaps 70 (i.e., dovetailed recess) are formed between adjacent rotor poles 68. Permanent magnets 72 are disposed in the interpolar gaps 70, with the permanent magnets 72 generating a magnetic field to be radially directed in an air gap between the rotor 56 and the stator 58. The magnetic field generated by the permanent magnets 72 further interacts with a stator magnetic field to produce a torque.

The stator assembly 58 of the IPM machine 10 includes a stator core 74 having multiple stator teeth 76 arranged circumferentially so as to form a cavity 78 at a center of the stator core 74. The stator assembly 58 generates a magnetic field and extends along the longitudinal axis with an inner surface defining the cavity 78. The rotor assembly 56, as discussed above, is disposed within the cavity 78 defined by the stator core 40. The stator assembly 58 includes stator slots 80 for receiving distributed windings 82 therein that are wound on the teeth 76. The windings 82 may be formed as copper coils, for example, and function to produce a fairly sinusoidal rotating field in the air gap when excited by AC currents.

Figure 5:
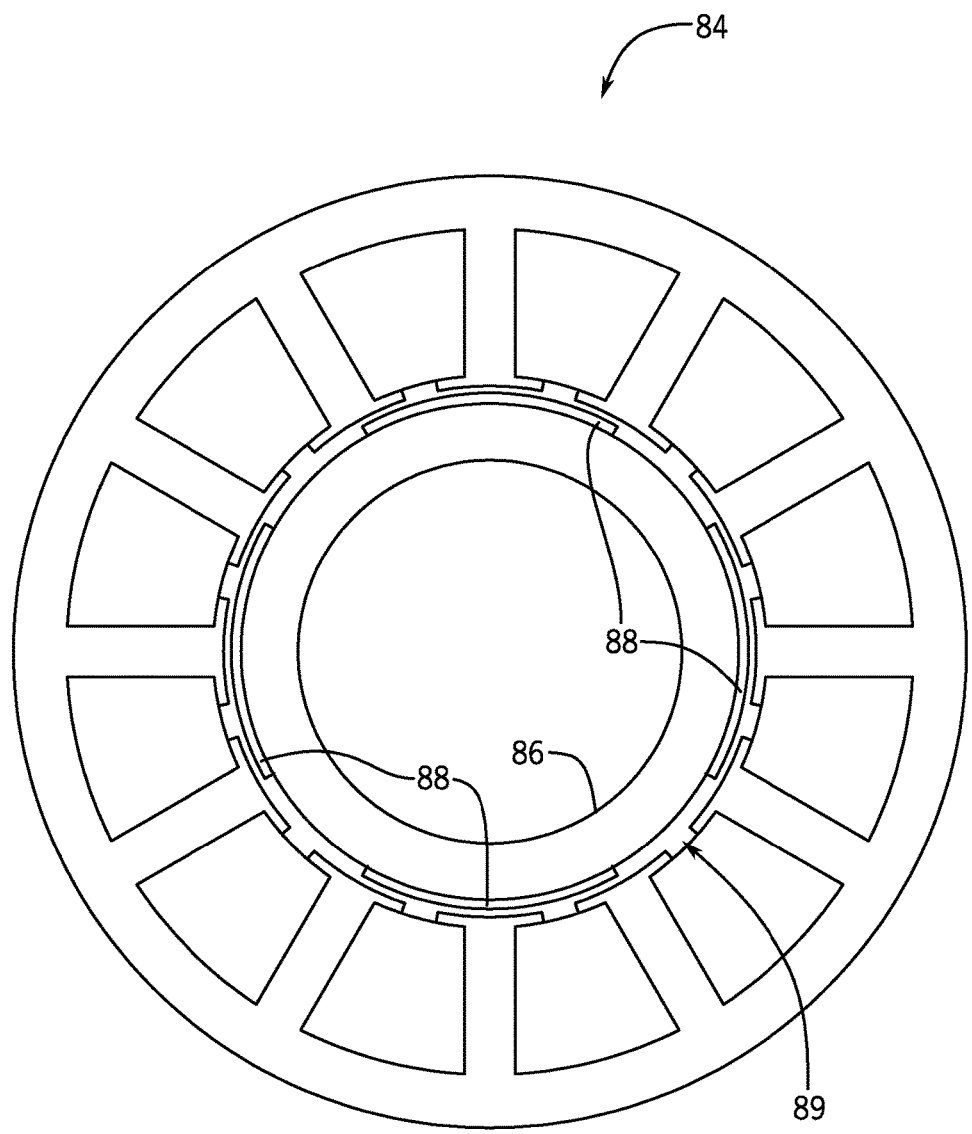
FIG. 5 is a schematic view of a surface permanent magnet machine useable with embodiments of the invention.
Figure 6:
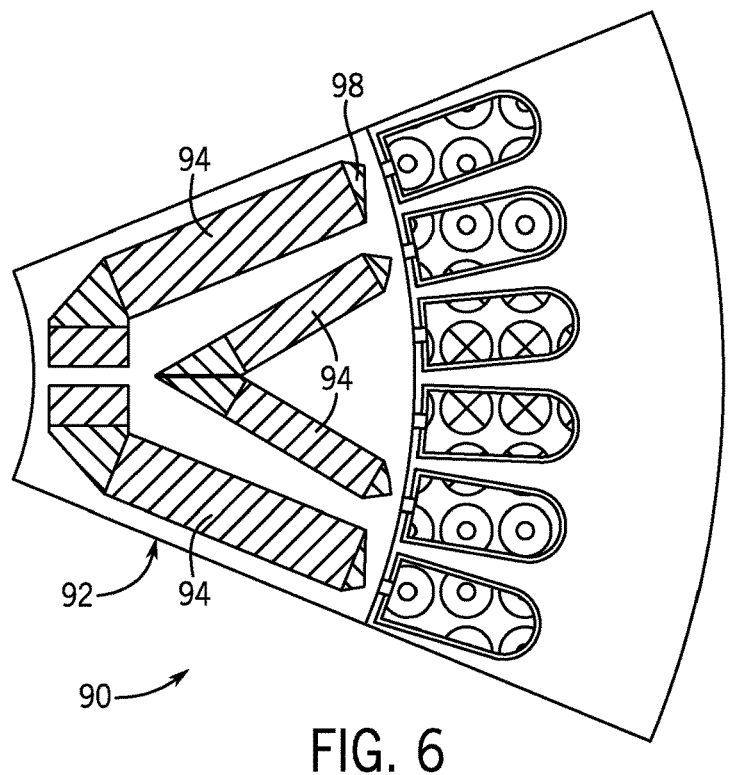
FIGS. 6 and 7 are schematic views of a portion of an internal permanent magnet (IPM) machine useable with embodiments of the invention.
Figure 7:
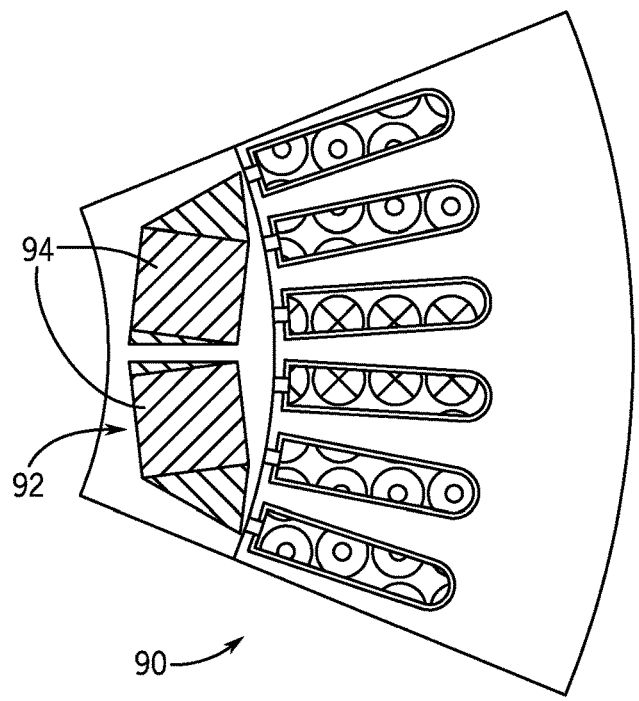

Referring now to FIGS. 5-7, additional IPM machines are shown that incorporate a generally round rotor (i.e., no salient rotor poles thereon). FIG. 5 illustrates an IPM machine 84 with a rotor 86 having surface permanent magnets 88 (SPMs) affixed/embedded to an outer surface 89 thereof. FIGS. 6 and 7 each show a portion of an IPM machine 90 with a rotor 92 having permanent magnets 94 embedded in the rotor (i.e., within the stack of rotor laminations), with FIG. 6 illustrating a rotor 92 having permanent magnets 94 embedded therein in a U-shaped pattern and a V-shaped pattern and FIG. 7 illustrating a rotor 92 having permanent magnets 94 embedded therein in a V-shaped pattern.

Figure 8:
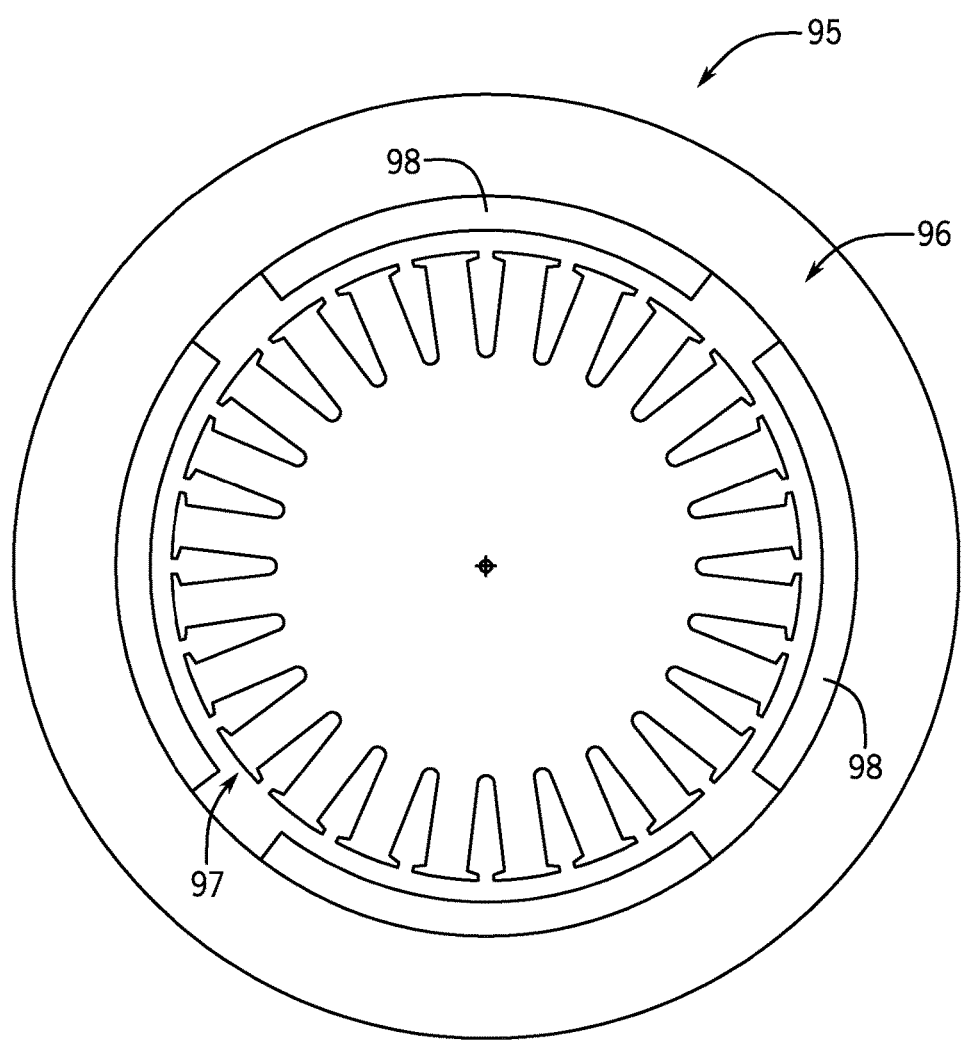
FIG. 8 is a schematic view of an outer rotor permanent magnet machine useable with embodiments of the invention

Referring to FIG. 8, an outer rotor permanent magnet electrical machine 95 is illustrated according to another embodiment. The construction of the machine 95 is such that a rotor 96 forms an outer part of the machine and is positioned about a stator 97. Permanent magnets 98 are provided on the rotor on an inner surface thereof adjacent the stator 97, with the permanent magnets 98 generating a magnetic field to be radially directed in an air gap between the rotor 96 and the stator 97. The magnetic field generated by the permanent magnets 98 further interacts with a stator magnetic field to produce a torque.

It is recognized that FIGS. 3-8 are meant to only illustrate examples of electrical machines that can benefit from incorporating embodiments of the invention. That is, embodiments of the invention can be implemented in a plurality of different types of PM electrical machines, and thus embodiments of the invention are not meant to be limited only to the types of electrical machines shown and described in FIGS. 3-8. A non-limiting list of additional PM electrical machines—not all of which are specifically illustrated herein—that could also benefit from incorporating embodiments of the invention therewith includes: PM electrical machines that function as motors and/or generators; radial flux, axial flux, and transverse flux electric machine topologies; and radial flux machine alternative, including inner rotor, outer rotor, dual stator, or dual rotor electrical machines. Still further, such PM electrical machines may incorporate various features/architectures, including: tooth wound (concentrated) or distributed windings; formed wound or random wound coils; solid or Litz wire conductors; and non-hollow or hollow conductors, for example.

According to exemplary embodiments of the invention, each of the PM electrical machines shown in FIGS. 1-8 may have a protection scheme implemented during operation thereof in order to prevent demagnetization of the permanent magnets therein that might occur during a fault occurrence. Upon detection of a fault in the PM electrical machine (e.g., a turn-to-turn fault, full phase, etc.), such as via detection of a change in the three-phase voltages and currents supplied to the PM electrical machine, the control scheme operates to selectively control the switching in an inverter supplying three-phase power to the PM electrical machine, so as to control voltages (and associated currents) provided to the PM electrical machine on each phase and thereby prevent demagnetization of the permanent magnets.

Figure 9:
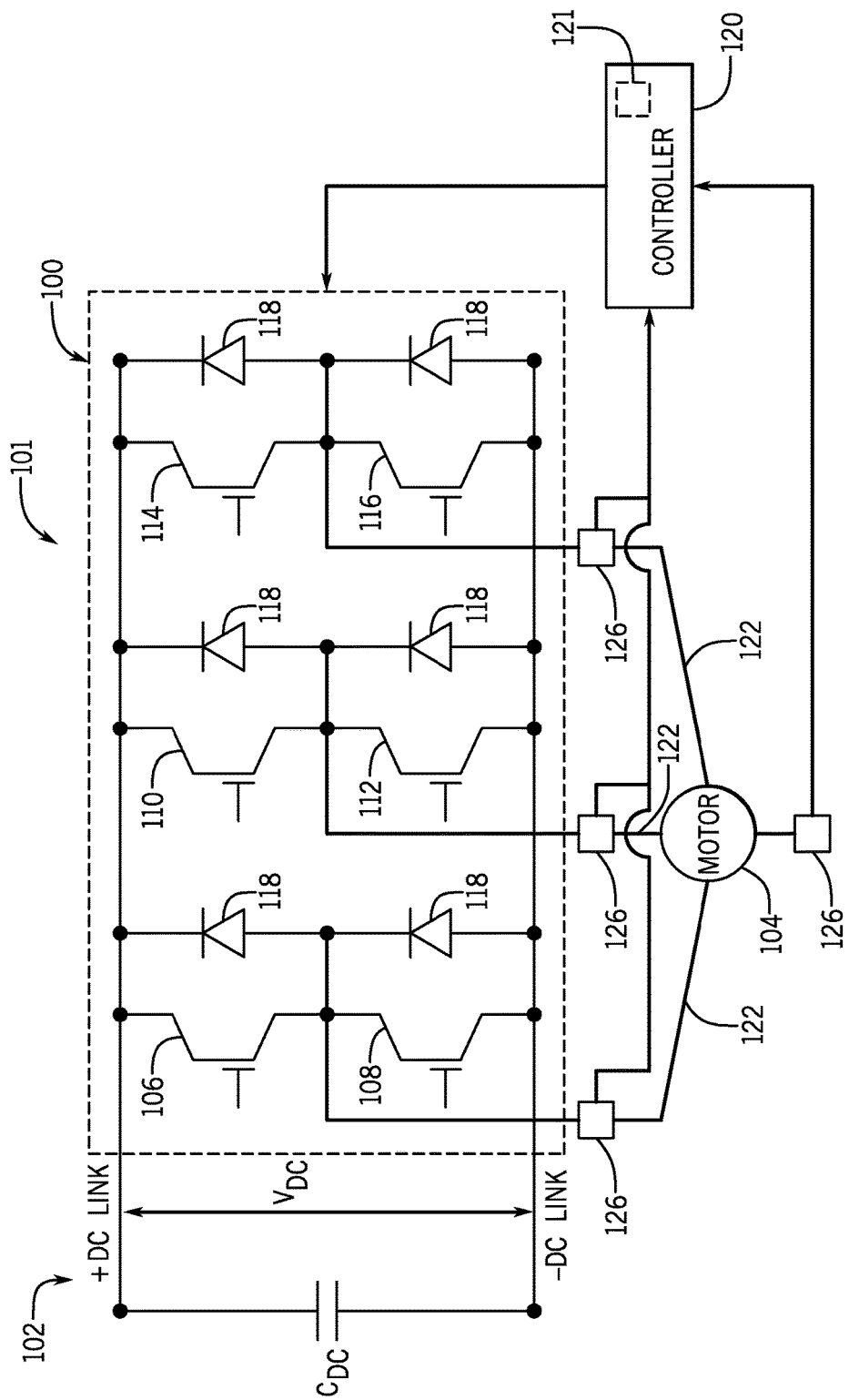
FIG. 9 is a circuit schematic diagram of a motor drive and associated inverter and controller for use with embodiments of the invention.

Referring now to FIG. 9, a schematic diagram of an inverter 100 operated as part of a motor drive 101 that provides three-phase power to a PM electrical machine is illustrated for purposes of explaining the invention. As shown in FIG. 9, a DC link 102 provides a DC input voltage that is converted by 3-phase pulse width modulation (PWM) inverter 100 to an AC waveform that powers a PM electrical machine 104. The inverter 100 includes two series-connected switching devices per phase leg. For example, devices 106 and 108 form a first phase leg, devices 110 and 112 form a second phase leg, and devices 114 and 116 form a third phase leg. Devices 106-116 are conventional silicon semiconductor switching devices such as, for example, IGBTs, MOSFETs, SCR, or IGCT type devices, for example. Diodes 118 are coupled in anti-parallel relationship across respective silicon switching devices 106-116. A controller 120 is operatively connected to the switching devices 106-116 to control switching thereof between a conducting On state and a non-conducting Off state, to control the 3-phase output currents and voltages provided to the PM electrical machine 104.

In operation, controller 120 (and processor 121 therein) operates to implement a control scheme to selectively control the switching of switching devices 106-116 in inverter 100 (via providing gating signals to the switching devices) to produce a set of voltages or currents output by inverter 100 on each phase 122—with currents being controlled directly or indirectly via controlling voltage—so as to generate corresponding output currents from the inverter 100 that combine with the current(s) flowing in the faulted section(s) of the PM electrical machine 104 so as to result in a limitation of the peak magnetic flux component that acts to demagnetize the permanent magnets, i.e., limiting the negative d-axis component of the flux. The set of currents provided to the PM electrical machine 104 will be specific to the fault identified, i.e., fault type, number of phases, etc., such that a customized solution to the particular fault is provided to prevent demagnetization.

With respect to the controlling of the three-phase currents, voltages, and magnetic fluxes in the PM electrical machine, it is known that a dq0 (or dqz) transformation is a common tool in electrical machines analysis—with the dq0 transformation being a base-transformation that transforms sinusoidally varying signals in the machine (i.e., the currents, voltages, magnetic fluxes) into constant values, thus making analysis much easier to perform. For a three-phase electrical machine, the transformation is described by:

$$i_{dqc} = \qquad\qquad\qquad\qquad\qquad\qquad\qquad\qquad [\text{Eqn. 1}]$$

$$Pi_{abc} = \sqrt{\frac{2}{3}} \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \\ \frac{\sqrt{2}}{2} & \frac{\sqrt{2}}{2} & \frac{\sqrt{2}}{2} \end{bmatrix} * \begin{bmatrix} i_a \\ i_b \\ i_c \end{bmatrix},$$

where P is the transformation matrix employed and θ the parameter of such transformation, usually assumed equal to the relative electrical position between stator and rotor reference points, with one common choice assuming θ=0 for the stator-rotor relative position corresponding to the peak of the fundamental flux linkage in one of the phases of the machines.

For a balanced and symmetrical three-phase system, [Eqn. 1] yields:

$$\text{if} \begin{cases} i_a(t) = \sqrt{2} * I * \sin(\omega t + \gamma) \\ i_b(t) = \sqrt{2} * I * \sin\left(\omega t + \gamma - \frac{2}{3} * \pi\right) \\ i_c(t) = \sqrt{2} * I * \sin\left(\omega t + \gamma 4\frac{2}{3} * \pi\right) \end{cases} \rightarrow \begin{cases} i_d(t) = -I * \sin(\gamma) \\ i_q(t) = I * \cos(\gamma) \\ i_0(t) = 0 \end{cases} \quad [\text{Eqn. 2}]$$

where w is the electrical speed of the fundamental component of the magnetic field, expressed in rad/s (ω=2πf$_{synch}$, f$_{synch}$ being the synchronous frequency of the machine) and γ is the phase displacement angle between the balanced set of currents supplied to the phases of the machine and the balanced set of back-emf's induced in the same phases by the rotating magnetic field produced by the magnets located in the rotor.

Figure 10:
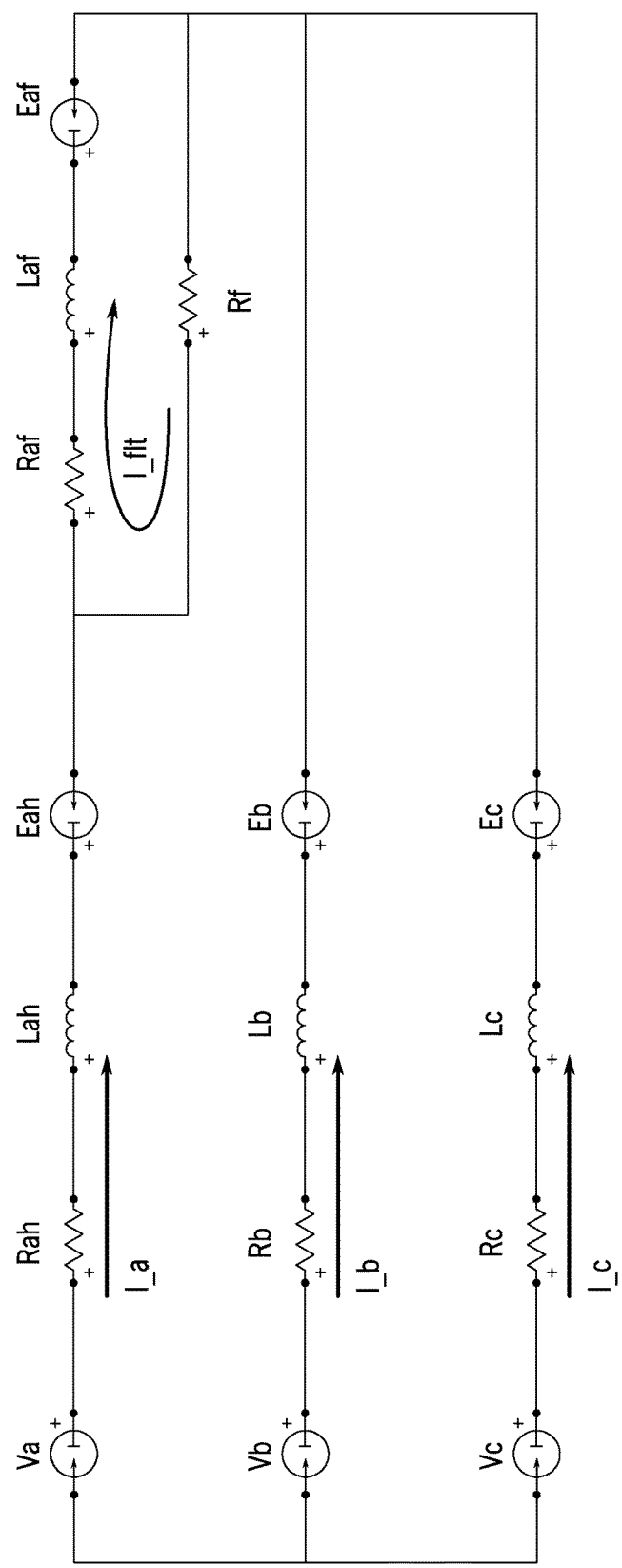
FIG. 10 is a circuit schematic diagram illustrating a turn-to-turn fault in a permanent magnet electrical machine.

However, for a PM electrical machine with a fault condition present therein, it is recognized that the three-phase currents, voltages, and magnetic fluxes in the machine become unbalanced, and that this unbalance can result in damage to the permanent magnets in the machine should the negative d-axis component of the flux not be limited. Referring now to FIG. 10, a circuit schematic illustrating a turn-to-turn fault is provided for purposes of explanation of such unbalance in a PM electrical machine, according to one example. In FIG. 10, the fault has been illustrated on the primary winding of phase A by connecting the fault resistance (R_short) across the shorted turns. When a turn-to-turn fault is present in the PM electrical machine, the faulted section actually behaves like a fourth phase that is not directly supplied by the inverter; hence, the three-phase voltages Va, Vb, Vc (and voltage during a turn-to-turn fault condition) in the machine may be described according to:

$$[v_{abcf}] = [R] \cdot [i_{abcf}] + [L] \cdot \frac{d}{dt} \cdot [i_{abcf}] + [\tilde{e}_{abcf}], \quad [\text{Eqn. 3}]$$

with the vectors and matrixes corresponding to:

$$[v_{abcf}] = \begin{bmatrix} v_a \\ v_b \\ v_c \\ 0 \end{bmatrix} \quad [\text{Eqn. 4}]$$

$$[i_{abcf}] = \begin{bmatrix} i_a \\ i_b \\ i_c \\ i_f \end{bmatrix}$$

$$[\tilde{e}_{abcf}] = \begin{bmatrix} e_{ah} \\ e_b \\ e_c \\ e_{af} + V_{af}(0^-) \end{bmatrix}$$

-continued $$[R] = \begin{bmatrix} R_{ah} + R_{af} & & & -R_{af} \\ & R_b & & \\ & & R_c & \\ -R_{af} & & & R_f \end{bmatrix}$$

$$[L] = \begin{bmatrix} L_{ah} + L_{af} + & M_{ah,b} & M_{ah,c} + & -(L_{af} + \\ 2M_{ah,af} & M_{af,b} & M_{af,c} & M_{ah,af}) \\ M_{ah,b} + M_{af,b} & L_b & M_{b,c} & -M_{af,b} \\ M_{ah,c} + M_{af,c} & M_{b,c} & L_c & -M_{af,c} \\ -(L_{af} + M_{ah,af}) & -M_{af,b} & -M_{af,c} & L_{af} \end{bmatrix},$$

where e represents the time-varying back-emf's induced in the phase by the rotating magnets (i.e. the open-circuit voltages), and $L_j$ and $M_{j,k}$ represent, respectively, the self-inductance of the phase j and the mutual inductance between phases j and k. Potentially, the self and mutual inductances can also be a function of rotor position, as per the effect of an anisotropic rotor (e.g., the IPM configurations shown in FIG. 8). The subscripts αh and αf indicate, respectively, the healthy and faulty portion of phase winding. The term $V_{af}(0^-)$, finally, is a mathematical artifact representing the inductive voltage that was acting on the faulty portion of the winding just prior to occurrence of the fault, with this term representing the energy stored (as magnetic field) at the instant of fault in the inductance associated to the faulty portion of the winding. Since such energy cannot immediately decay to zero, it induces a unipolar component of current in the faulty circuit, such that current maintains the same amplitude immediately after the fault event and slowly decreases as the stored energy is lost as ohmic losses in the winding resistance—eventually leading to a purely sinusoidal component of the fault current. $V_{af}(0^-)$ is a DC, rather than sinusoidal, voltage source.

During occurrence of a turn-to-turn fault, the fault current, $I_{fir}$, cannot be controlled, but can be calculated at each time instant by solving Eqn. 3, knowing all the other parameters. Once currents are known, the fluxes linkages, Ψ, in the phases a, b, c (and possibly $α_f$, in the case of turn-to-turn fault) can also be calculated according to:

$$\begin{bmatrix} \Psi_{ah} \\ \Psi_b \\ \Psi_c \\ \Psi_{af} \end{bmatrix} = \begin{bmatrix} \Psi_{0ah} \\ \Psi_{0b} \\ \Psi_{0c} \\ \Psi_{0af} \end{bmatrix} + [L] \begin{bmatrix} i_{ah} \\ i_b \\ i_c \\ i_{af} \end{bmatrix}, \quad [\text{Eqn. 5}]$$

where $\Psi_{af}$ is the phase α flux linkage, faulty, and $\Psi_{ah}$ is the phase α flux linkage, healthy, L is the matrix of inductances introduced in Eqn. 3 and $\Psi_0$ are the open-circuit flux linkages, which generate the back-emf's. From the-phase flux linkages, the transformed flux linkage values $\Psi_d$, $\Psi_q$, $\Psi_z$, may also be determined, with it being recognized that $\Psi_z$ will no longer be constant (i.e., no longer z=0). It is worth pointing out that when a fourth phase is introduced, the transformation matrix shown in Eqn. 1 is no longer valid and a new one, tailored for the specific fault condition, must be determined: this can be done, for example, by employing the space vector decomposition method. The new transformation will result into a new 4-dimensional space, where the usual d- and q-axis are complemented by two z-axes, called z1 and z2, that do not contribute to the electromechanical energy conversion.

According to embodiments of the invention, the three-phase power (voltages and associated currents) output from the inverter 100 (FIG. 9) are selectively controlled such that the d-axis flux $\Psi_d$ is controlled to remain below a demagnetization threshold—with a change in the d-axis flux $\Psi_d$ being held below an identified level that may vary based on the construction of the PM electrical machine (e.g., −0.2 volt-seconds (V-s)). In an exemplary embodiment, $\Psi_d$ remains constant between the pre-fault and post-fault conditions while $\Psi_q$, $\Psi_{z1}$, and $\Psi_{z2}$ are allowed to fluctuate/vary, with this control being described according to:

$$\begin{bmatrix} \Psi_d \\ \Psi_q \\ \Psi_z = 0 \end{bmatrix} \dashrightarrow \begin{bmatrix} \Psi'_d = \Psi_d \\ \Psi'_q \\ \Psi_{z1} \\ \Psi_{z2} \end{bmatrix}. \quad \text{[Eqn. 6]}$$

It is recognized that continuing to supply the usual, pre-fault voltages and currents to the PM electrical machine would result in the fault current, $I_f$, following its natural evolution, therefore resulting in an accompanying change in the d-axis flux $\Psi_d$ and potentially causing demagnetization of the permanent magnets in the PM electrical machine. However, according to embodiments of the invention, the evolution of $I_f$ may be indirectly forced/constrained via proper control of the voltages/currents provided to the PM electrical machine—such as controlling each of the three-phase voltages in the case of a turn-to-turn fault or controlling voltages on 2 phases in the case of a single phase fault—in order to constrain the evolution of $I_f$ and accordingly limit the amplitude of the negative d-axis flux $\Psi_d$, thereby preventing demagnetization of the permanent magnets in the PM electrical machine.

In addition to limiting the change in the negative d-axis flux $\Psi_d$, thereby preventing demagnetization of the permanent magnets in the PM electrical machine, it is further desirable that the altering of the voltages/currents provided to the PM electrical machine is such that continued operation of the machine is optimized as much as possible. That is, it is recognized that the voltages/currents provided to the PM electrical machine—while preventing demagnetization of the permanent magnets—also result in minimized losses in the machine and produce a same torque, speed, and power in the machine as compared to the pre-fault operating conditions (if not the same, then torque/speed/power maintained as high as possible.

Figure 11:
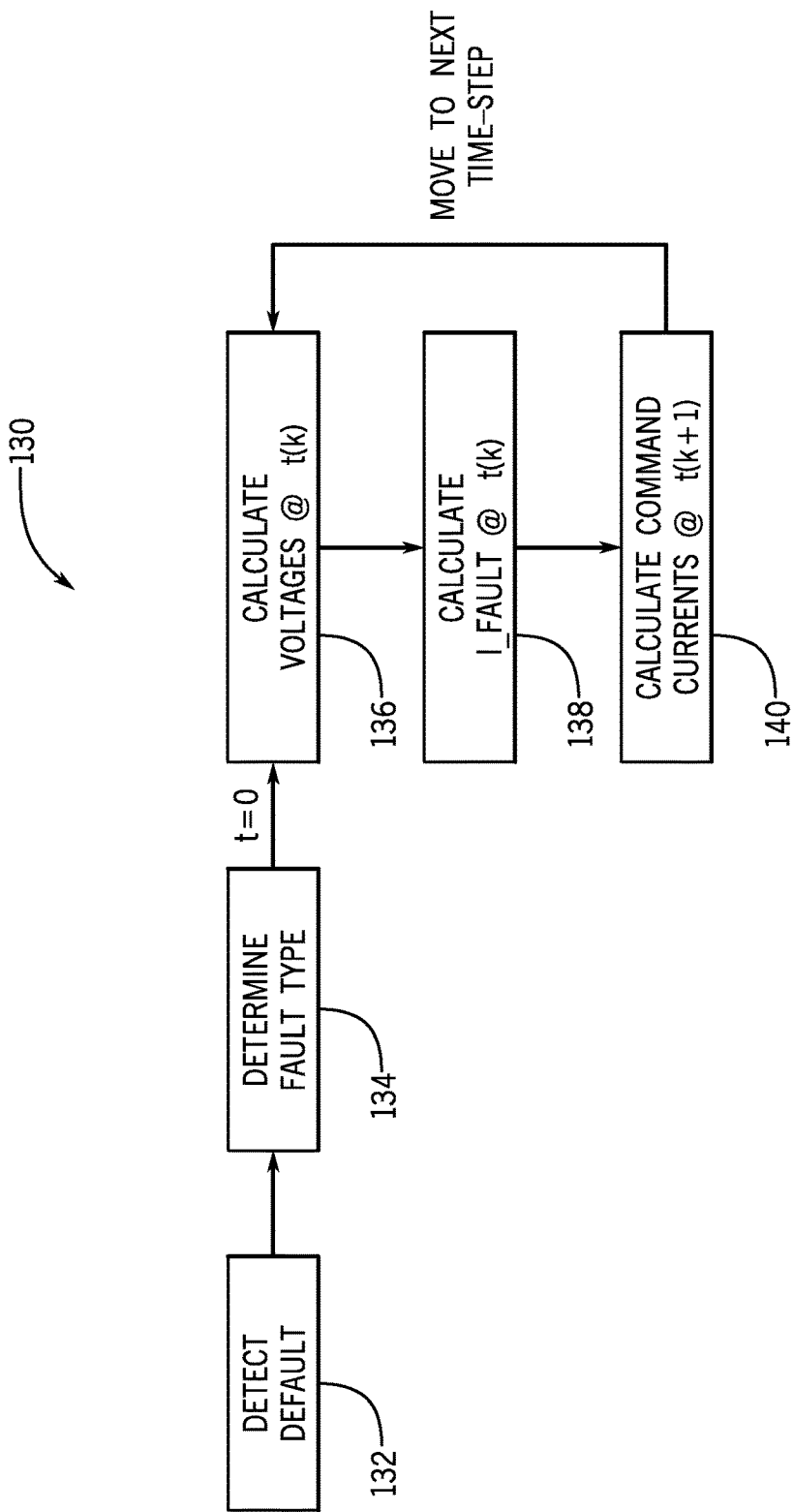
FIG. 11 is a flow chart illustrating a post-fault protection scheme for preventing demagnetization of ceramic permanent magnets in a permanent magnet electrical machine, according to an embodiment of the invention.

Referring now to FIG. 11, and with continued reference back to FIGS. 1-9 and components therein, a flowchart illustrating a post-fault protection scheme 130 for preventing demagnetization of permanent magnets in a PM electrical machine is provided, including low cost (e.g., ceramic) that exhibit little resistance to demagnetization and higher cost permanent magnets that exhibit higher resistance to demagnetization (e.g., rare earth magnets, such as neodymium or samarium magnets). The technique begins at STEP 132 with the detection of a fault condition in the PM electrical machine. The faulty state of the PM electrical machine may be detected via monitoring voltages and/or currents supplied to the motor across/on one phase or multiple phases as well as voltages/currents in the PM electrical machine and measuring a change in the pattern of these voltages and/or currents. The detected voltages and/or currents may be provided via a sensing system that includes voltage and/or current sensors at various locations—including on input phases supplying power to the PM electrical machine and/or on windings of the PM electrical machine, as illustrated by sensors 126 in FIG. 9.

Upon detection of a fault in the PM electrical machine, a determination is made at STEP 134 regarding the type of fault that is present. The determination of the type of fault present in the PM electrical machine may be made via a controller—such as controller 120 illustrated in FIG. 9 or a separate dedicated controller. The controller 120 may have an algorithm stored therein that uses an intelligent voltage/current signature identification technique and a lookup table to identify the type of fault present in the PM electrical machine. According to embodiments of the invention, the algorithm may analyze the sampled voltage/current readings from sensing system in order to determine the magnitude of voltage/current values on each phase, determine differences in voltage/current values between phases, compare the voltage/current readings to threshold voltage/current values and/or in order to identify a pattern in the voltage/current readings.

In determining the magnitude of voltage/current values on each phase and determining the differences in voltage/current values between phases, the acquired voltage/current readings may be compared to stored threshold voltage/current values located within a lookup table, with readings above or below the indicated thresholds being indicative of a particular fault type. In identifying a pattern in the voltage/current readings, the acquired voltage/current readings may be analyzed over a predefined period of time, such as 5 milliseconds as a non-limiting example; the sampling frequency shall be tuned accordingly to the specific dynamics of the motor and the application. The acquired current readings may be filtered such that it is immune to noise and includes data captured during a relevant frequency window for pattern detection and then compared to predefined current patterns indicative of particular fault conditions, which may be dependent upon the operating characteristics and specifications of the PM electrical machine. According to various embodiments, current patterns indicative of particular fault conditions may be defined based on the settling time of the sensed current data and/or an integrated pattern within the sensed current data, as non-limiting examples. In one embodiment, controller 120 or an internal memory module thereof is preprogrammed with a number of predefined voltage/current patterns indicative of particular fault conditions for various types of PM electrical machines. Controller 120 may be configured to access the predefined voltage/current patterns appropriate for the configuration of the particular PM electrical machine. In another embodiment, controller 120 is programmed to operate in a learning mode that identifies current/voltage patterns indicative of a particular fault condition during operation of the PM electrical machine. When a fault is identified, controller 120 operates an algorithm that analyzes patterns within the sensed current/voltage data received from sensing system prior to identification of the fault condition. In one embodiment of the invention these patterns are saved within a memory module of the controller 120 or a computer or external storage device (not shown) coupled to the controller. Controller 120 is programmed to access these stored patterns to identify a particular fault during later operation of the PM electrical machine. Other embodiments of the invention may, however, make use of neural networks and/or deep learning techniques to identify the type of fault.

Upon determination of the particular fault type present in the PM electrical machine at STEP 136, the technique 130 continues by implementing an appropriate remedial strategy that is based on the particular type of fault. That is, the remedial strategy will be different in the machine if the fault is, for example, a turn-to-turn fault involving one single phase versus multiple different phases. In implementing a specific and appropriate remedial strategy, the technique 130 operates to selectively control the switching in an inverter supplying three-phase power to the PM electrical machine, so as to control voltages/currents output thereby on each phase.

As illustrated in FIG. 11, according to an exemplary embodiment, the remedial strategy is implemented by first determining three-phase voltages provided to the PM electrical machine at STEP 136 at a time t(k). At STEP 138, the fault current $I_{flt}$ is calculated at time t(k)—such as via useage of Eqn. 3 previously set forth. Based on the calculated fault current $I_{flt}$, command currents to be provided to the PM electrical machine from the inverter at a time t(k+1) are calculated at STEP 140, with these currents combining with the current(s) flowing in the faulted section(s) of the PM electrical machine so as to result in a limitation of the peak magnetic flux component that acts to demagnetize the permanent magnets, i.e., limiting the negative d-axis component of the flux. The technique 130 then loops back to STEP 134 to continue implementing of the remedial strategy at the time t(k+1).

Beneficially, embodiments of the invention thus provide a system and method for implementing a post-fault protection scheme for preventing demagnetization of permanent magnets in such electrical machines. A post-fault protection scheme is implemented based on the PM electrical machine type and the specific fault experienced by the machine, i.e., fault type, number of phases, etc., with three phase voltages and currents supplied to the PM electrical machine being tailored to the identified fault type, such that a customized solution to the particular fault is provided to prevent demagnetization. By controlling the phase voltages and currents supplied to the PM electrical machine, the peak negative d-axis component of the magnetic flux component may be controlled, with it being recognized that the negative d-axis component of the flux acts to demagnetize the permanent magnets if a value thereof exceeds a certain value. Demagnetization of the permanent magnets after a fault is thus prevented, while also allowing for a process being performed by the PM electrical machine to be brought to a stop in a safe and controlled manner. Accordingly, any damages caused by the fault in the PM electrical machine are confined/limited to less costly components therein, such as a winding fault damaging only the windings in the machine (which can relatively easily be reconstructed) and/or the power converter, for example, without damages propagating to the permanent magnets.

Therefore, according to one embodiment of the invention, a motor drive for driving an electrical machine having one or more permanent magnets therein is provided. The motor drive includes an inverter having a plurality of switches therein that are selectively operated to control current flow and terminal voltages in the electrical machine and a controller operatively connected to the inverter and configured to control switching of the plurality of switches to control the current flow and terminal voltages in the electrical machine. The controller is programmed to analyze at least one of voltages and currents provided to the electrical machine on one or more phases to identify a fault in the electrical machine, and control switching of the plurality of switches in the inverter to modify current flow and terminal voltages in the electrical machine based on the identified fault, wherein the modified current flow and terminal voltages in the electrical machine prevent demagnetization of the one or more permanent magnets in the electrical machine.

According to another embodiment of the invention, a method for implementing a post-fault protection technique for preventing demagnetization of permanent magnets in an electrical machine is provided. The method includes monitoring, via a controller, at least one of voltages and currents supplied to the electrical machine, analyzing, via the controller, the at least one of the voltages and currents supplied to the electrical machine to detect a fault condition in the electrical machine, determining, via the controller, a fault type of the detected fault condition based on the analyzed at least one of the voltages and currents, and modifying, via the controller, the voltages and currents supplied to the electrical machine on at least one phase based on the determined fault type, wherein modifying the voltages and currents supplied to the electrical machine on the at least one phase constrains a fault current in the electrical machine, so as to control a negative d-axis magnetic flux in the electrical machine and thereby prevent demagnetization of the permanent magnets.

According to yet another embodiment of the invention, a controller configured to control operation of an inverter so as to control currents and voltages output to a permanent magnet electrical machine connected thereto is provided. The controller comprises a processor programmed to receive inputs regarding at least one of currents and voltages provided to the permanent magnet electrical machine on one or more phases, analyze the at least one of the voltages and currents to identify a fault in the permanent magnet electrical machine and, upon identification of a fault, control switching of a plurality of switches in the inverter to modify the currents and voltages provided to the permanent magnet electrical machine based on a type of the identified fault. The modified currents and voltages provided to the permanent magnet electrical machine maintain a d-axis magnetic flux in the permanent magnet electrical machine at a level that prevents demagnetization of one or more permanent magnets therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor drive for driving an electrical machine having one or more permanent magnets therein, the motor drive comprising:

an inverter having a plurality of switches therein that are selectively operated to control current flow and terminal voltages in the electrical machine; and a controller operatively connected to the inverter and configured to control switching of the plurality of switches to control the current flow and terminal voltages in the electrical machine, the controller being programmed to:

analyze at least one of voltages and currents provided to the electrical machine on one or more phases to identify a fault condition in the electrical machine; and control switching of the plurality of switches in the inverter to modify current flow and terminal voltages in the electrical machine based on the identified fault condition, so as to prevent demagnetization of the one or more permanent magnets in the electrical machine.

2. The motor drive of claim 1 wherein the one or more permanent magnets comprise ceramic permanent magnets.

3. The motor drive of claim 1 wherein, in identifying the fault condition in the electrical machine, the controller is further programmed to identify a change in a pattern of the at least one of the voltages and currents supplied to the electrical machine.

4. The motor drive of claim 1 wherein, in identifying the fault condition in the electrical machine, the controller is further programmed to:
analyze the at least one of the voltages and currents via an intelligent signature identification algorithm, so as to identify a voltage and/or current signature therefrom; and
identify a fault type in the electrical machine based on the identified voltage and/or current signature, via one or more of a lookup table, a neural network, or a deep learning technique.

5. The motor drive of claim 1 wherein, in modifying the current flow and terminal voltages in the electrical machine, the controller is further programmed to indirectly control a fault current in the electrical machine based on the modified current flow and terminal voltages.

6. The motor drive of claim 5 wherein, in modifying the current flow and terminal voltages and controlling the fault current in the electrical machine, the controller is further programmed to maintain a d-axis magnetic flux in the electrical machine above a pre-determined threshold, so as to prevent demagnetization of the permanent magnets in the electrical machine.

7. The motor drive of claim 1 wherein, in modifying the current flow and terminal voltages in the electrical machine, the controller is further programmed to maintain a torque and speed in the electrical machine at a pre-fault torque and speed level via the modified voltages and currents supplied to the electrical machine.

8. The motor drive of claim 1 wherein, in modifying the current flow and terminal voltages in the electrical machine, the controller is further programmed to minimize losses in the electrical machine via the modified current flow and terminal voltages in the electrical machine.

9. The motor drive of claim 1 wherein the identified fault comprises one or more of a turn-to-turn fault or a full phase fault.

10. The motor drive of claim 1 wherein the electrical machine driven thereby is operable as a motor and/or a generator.

11. The motor drive of claim 1 wherein the electrical machine driven thereby comprises one of a radial flux, axial flux, or transverse flux electrical machine, and wherein the electrical machine comprises one of an inner rotor, outer rotor, dual stator, or dual rotor electrical machine.

12. The motor drive of claim 1 wherein the electrical machine driven thereby comprises one of tooth wound or distributed windings, and wherein the electrical machine comprises one of formed wound or random wound coils.

13. The motor drive of claim 1 wherein the electrical machine driven thereby comprises conductors formed as solid or Litz wires or formed as hollow or non-hollow conductors.

14. The motor drive of claim 1 wherein the one or more permanent magnets of the electrical machine are located on a rotor or on a stator of the electrical machine, with a configuration of the one or more permanent magnets comprising a SPM (Surface Permanent magnet), IPM (interior permanent magnet), XPM (Inset permanent magnet), or spoke permanent magnet configuration.

15. A method for implementing a post-fault protection technique for preventing demagnetization of permanent magnets in an electrical machine, the method comprising:
monitoring, via a controller, at least one of voltages and currents supplied to the electrical machine;
analyzing, via the controller, the at least one of the voltages and currents supplied to the electrical machine to detect a fault condition in the electrical machine;
determining, via the controller, a fault type of the detected fault condition based on the analyzed at least one of the voltages and currents; and
modifying, via the controller, the voltages and currents supplied to the electrical machine on at least one phase based on the determined fault type;
wherein modifying the voltages and currents supplied to the electrical machine on the at least one phase constrains a fault current in the electrical machine, so as to control a negative d-axis magnetic flux in the electrical machine and thereby prevent demagnetization of the permanent magnets.

16. The method of claim 15 wherein detecting a fault condition in the electrical machine comprises identifying a change in a pattern of the at least one of the voltages and currents supplied to the electrical machine.

17. The method of claim 15 wherein determining the fault type of the detected fault condition comprises:
analyzing the at least one of the voltages and currents via an intelligent signature identification algorithm, so as to identify a voltage and/or current signature therefrom; and
identifying the fault type in the electrical machine based on the identified voltage and/or current signature, via one or more of a lookup table, a neural network, or a deep learning technique.

18. The method of claim 15 wherein the d-axis magnetic flux in the electrical machine is maintained above a pre-determined threshold, so as to prevent demagnetization of the permanent magnets.

19. The method of claim 15 wherein, in modifying the voltages and currents supplied to the electrical machine, the method comprises maintaining a torque and speed in the electrical machine at a pre-fault torque and speed level via the modified voltages and currents supplied to the electrical machine.

20. The method of claim 15 wherein, in modifying the voltages and currents supplied to the electrical machine, the method comprises controlling operation of a motor drive operatively connected to the electrical machine to control input voltages and currents supplied to all available phases of the electrical machine.

21. A controller configured to control operation of an inverter so as to control currents and voltages output to a permanent magnet electrical machine connected thereto, the controller having a processor programmed to:
receive inputs regarding at least one of currents and voltages provided to the permanent magnet electrical machine on one or more phases;
analyze the at least one of the voltages and currents to identify a fault in the permanent magnet electrical machine; and upon identification of a fault, control switching of a plurality of switches in the inverter to modify the currents and voltages provided to the permanent magnet electrical machine based on a type of the identified fault;

wherein the modified currents and voltages provided to the permanent magnet electrical machine maintain a d-axis magnetic flux in the permanent magnet electrical machine at a level that prevents demagnetization of one or more permanent magnets therein.

22. The controller of claim 21 wherein the processor is programmed to determine the type of the fault by analyzing the at least one of the voltages and currents via an intelligent signature identification algorithm, so as to identify a voltage and/or current signature therefrom indicative of the fault type.

23. The controller of claim 21 wherein, in modifying the currents and voltages provided to the permanent magnet electrical machine, the processor is programmed to indirectly control a fault current in the permanent magnet electrical machine based on the modified currents and voltages, thereby maintaining the d-axis magnetic flux in the permanent magnet electrical machine at the desired level.

24. The controller of claim 21 wherein the processor is programmed to maintain a torque and speed in the permanent magnet electrical machine at a pre-fault torque and speed level via the modified voltages and currents supplied thereto.

25. The controller of claim 21 wherein the modification of the currents and voltages provided to the permanent magnet electrical machine is selectively controlled based on the fault type and the number of phases on which the fault is present.

* * * * *